United States Patent [19]

Hashimoto

[11] Patent Number: 5,216,228

[45] Date of Patent: Jun. 1, 1993

[54] BAR CODE TRANSMISSION AND RECEPTION SYSTEM AND METHOD

[75] Inventor: Kazuo Hashimoto, Tokyo, Japan

[73] Assignee: Hashimoto Corporation, Tokyo, Japan

[21] Appl. No.: 746,180

[22] Filed: Aug. 15, 1991

Related U.S. Application Data

[63] Continuation of Ser. No. 350,823, May 12, 1989, abandoned.

[51] Int. Cl.⁵ .................. H04M 1/64; H04M 11/00; G06K 7/10
[52] U.S. Cl. .................. 235/375; 379/102; 379/104; 235/462
[58] Field of Search .......... 235/375, 462, 472; 358/335; 379/102, 104, 105, 106

[56] References Cited

U.S. PATENT DOCUMENTS

| | | |
|---|---|---|
| 4,475,153 | 10/1984 | Kihara et al. .................. 358/335 X |
| 4,503,288 | 3/1985 | Kessler . |
| 4,546,382 | 10/1985 | McKenna et al. . |
| 4,603,232 | 7/1986 | Kurland et al. . |
| 4,625,080 | 11/1986 | Scott .................. 358/335 X |
| 4,654,482 | 3/1987 | DeAngelis . |
| 4,829,555 | 5/1989 | Hashimoto .................. 379/102 X |
| 4,841,562 | 6/1989 | Lem .................. 379/102 X |
| 4,899,370 | 2/1990 | Kameo et al. .................. 235/379 X |
| 4,905,080 | 2/1990 | Watanabe et al. . |
| 4,916,441 | 4/1990 | Gombrich .................. 235/462 X |
| 4,952,785 | 8/1990 | Kikuda .................. 235/462 X |
| 4,983,818 | 1/1991 | Knowles .................. 235/462 X |

*Primary Examiner*—John Shepperd
*Assistant Examiner*—Esther H. Chin
*Attorney, Agent, or Firm*—Lowe, Price, LeBlanc & Becker

[57] ABSTRACT

A bar code communication system and method uses a bar code reader to scan a bar code to develop an audible signal that is acoustically coupled to a telephone line. The signal on the telephone line is received by a called station, decoded and the content of the bar code reported back to the calling party, using voice synthesis, for confirmation. The received signal may then be used to control a VCR or other external apparatus.

21 Claims, 3 Drawing Sheets

Figure 4
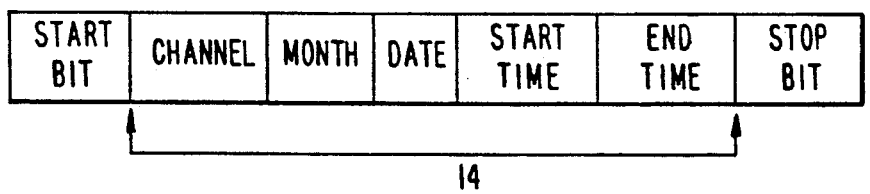
Figure 5(a)
 (28 KHz)
Figure 5(b)
 (2.1 KHz)
Figure 5(c)
 (28 KHz)
Figure 5(d)

BAR CODE TRANSMISSION AND RECEPTION SYSTEM AND METHOD

This application is a continuation of application Ser. No. 07/350,823 filed May 12, 1989 now abandoned.

BACKGROUND OF THE INVENTION

In various kinds of conventional methods of sending signals scanned by a bar code to a remote location, the signal once read out by the bar code is applied directly to a computer or a personal computer to be transformed into a digital signal, and thereafter that signal is sent out to the remote location through a telephone line or the like. A signal receiving device decodes that signal and transforms it into the original bar code. That original bar code is read by a reader.

Recently in a VCR or the like, a desired TV program is scanned by the bar code to control the VCR. In order to carry out this control more conveniently, there is a great demand for scanning the bar code on a TV program table by a portable bar code reader and sending it through the telephone line. However, there are difficulties in practical use in the conventional method in order to easily send the signal by means of the portable bar code reader or the like through the telephone line.

SUMMARY OF THE INVENTION

The present invention relates to a bar code transmission and reception system and method.

It is an object of the present invention to provide a novel bar code transmission and reception system and method wherein a bar code of a TV program or the like is read by a portable bar code reader and stored. Thereafter a receiving device is called by telephone using standard telephone lines, the stored bar code signal is encoded and sent from a loudspeaker through the mouthpiece of a telephone set in the form of an audible frequency signal, that audible frequency signal is received by the receiving device to decode it into the bar code signal, and that bar code is transformed into infrared rays so as to control a desired apparatus.

The above and other objects, features and advantages of the present invention will become more apparent from the following description when taken in conjunction with the accompanying drawings in which a preferred embodiment of the present invention is shown by way of illustrative example.

BRIEF DESCRIPTION OF DRAWINGS

FIG. 4 is a view showing the content of a bar code of the preferred embodiment of this invention.

FIGS. 5(a)–(d) show waveforms of the bar code of the preferred embodiment of the invention.

BEST MODE FOR PRACTICING THE INVENTION

Figure 1:
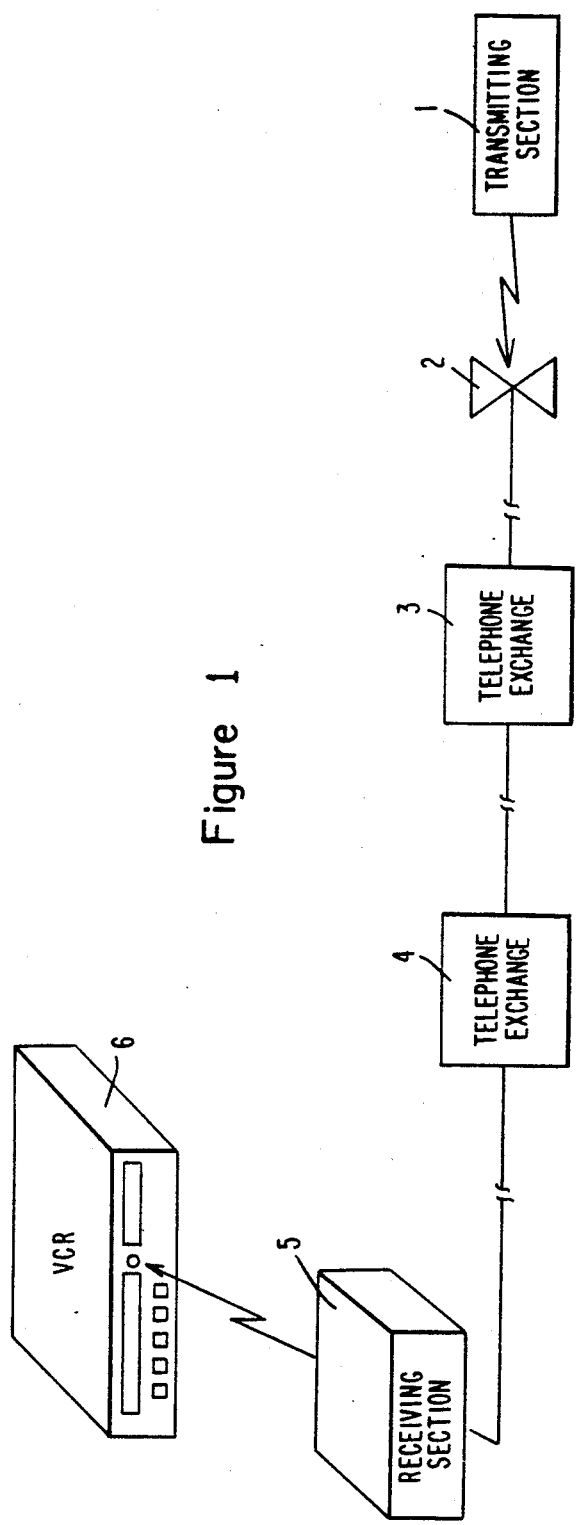
FIG. 1 is a block view explaining the principle of a preferred embodiment of this invention.

The arrangement and operation in the preferred embodiment of the present invention will now be described as follows. FIG. 1 is a block view explaining one preferred embodiment of this invention. Therein, reference numeral 1 denotes a transmitting section which outputs a code as an audio tone modulated by a specific frequency, after a bar code printed on a TV program table (not shown) is read and the read code is memorized temporarily. Reference numeral 2 denotes a telephone set of the sending side used by the owner who carries the transmitting section. Reference numeral 3 denotes a telephone exchange of the sending side. Reference numeral 5 denotes a receiving section which sends an outgoing message after the calling signal is received and the telephone line is set to a closed condition. When the owner outputs the bar code read by the transmitting section 1 through a mouthpiece (not shown in the drawings) of the telephone set 2 which is coupled acoustically, the output bar code reaches the receiving section through the telephone line, the telephone exchange 3 and the telephone exchange 4. The receiving section 5 demodulates the bar code modulated by audio frequency, 21 KHz in accordance with the frequency bandwidth of the telephone line, for example, but a VCR used in the preferred embodiment of the present invention is designed to receive the bar code modulated by no audio frequency of 28 KHz. Accordingly, this invention modulates the demodulated bar code to 28 KHz and sends the modulated bar code to a photodetector section of the VCR 6 through a light emitting diode (not shown in FIG. 1), and the TV program can be reserved for various minutes of time.

Figure 2:
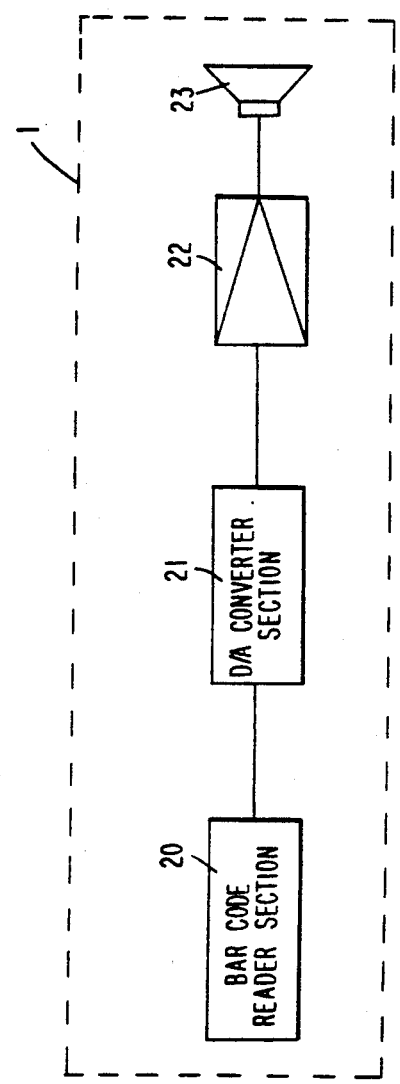
FIG. 2 is a block view explaining the transmitting section of the preferred embodiment of this invention.

The invention will now be described in detail in accordance with FIG. 2–FIG. 5. FIG. 2 shows a block view of the transmitting section 1. In FIG. 2, reference numeral 20 denotes a bar code reader section which uses directly a circuit of a bar code reader set in the VCR 6 in the example. FIG. 5 shows the bar code and corresponding modulated output waveforms. The marking point of the bar code in FIG. 5(a) outputs pulses of 28 KHz as shown in FIG. 5(b) through bar code reader section 20. Only a sine wave within a 300 Hz–3 KHz band can be output to the general telephone line for talking over the telephone. Accordingly, the pulses in FIG. 5(b) are converted to a sine wave of 2.1 KHz by a D/A converter section 21, and are sent to a receiving section 5 by coupling the converter section 21 to the mouthpiece of the telephone set 1 through an amplifier 22 and a speaker 23.

Figure 3:
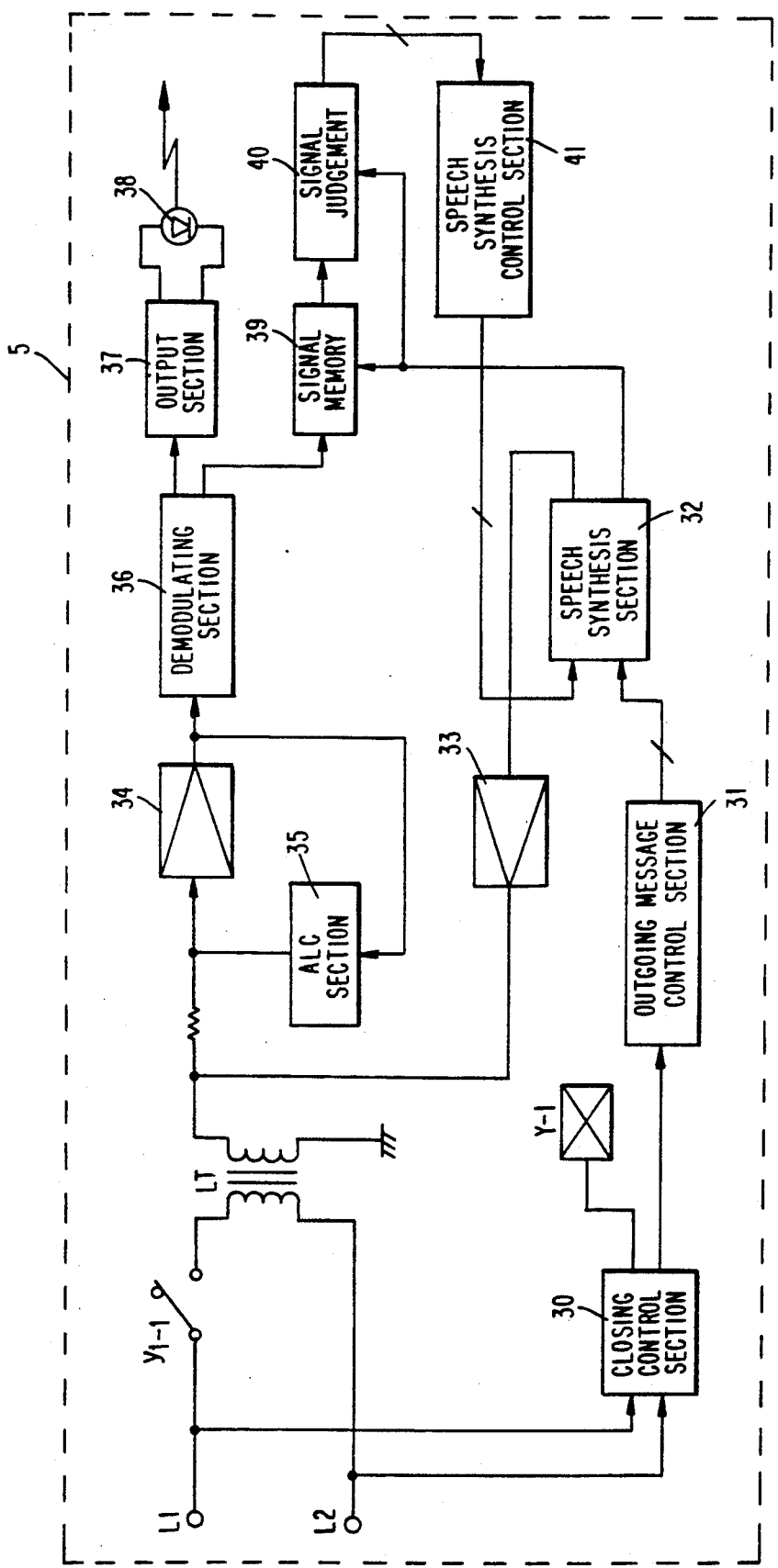
FIG. 3 is a block view explaining the receiving section of the preferred embodiment of this invention.

FIG. 3 shows a detailed block view of the receiving section 5. In FIG. 3, reference symbols L1, L2 denote a telephone line. Reference symbol LT denotes a line transformer. Reference numeral 30 denotes a closing control section which sets a load relay Y-1 to ON when the calling signal is detected, sets the telephone line to the closed condition by the point of contact y1-1, and releases the closed condition of the telephone line by setting the relay Y-1 to OFF by detecting the voltage variation of the telephone line when the calling party sets the telephone set to on-hook.

Reference numeral 31 denotes an outgoing message control section which outputs a start pulse for sending an outgoing message, which will be described later, when the output from the closing control section is received. Reference numeral 32 denotes a speech synthesis section which outputs information identifying the channel, for example, received for confirmation by a synthesized voice, after the outgoing message and the bar code for reserving a TV program, which will be described later, are received.

Reference numerals 33 and 34 denote amplifiers. Reference numeral 35 denotes an ALC circuit which sets the received bar code to a proper level. Reference numeral 36 denotes a demodulating section which demodulates the modulated bar code of 2.1 KHz to a signal of 28 KHz for the VCR which receives the bar code. Reference numeral 37 denotes an output section for a light emitting diode 38 for emitting infrared rays.

Reference numeral 39 denotes a demodulated signal memory section which converts the demodulated bar code to the binary number system, and stores the converted code to the binary number system. Reference numeral 40 denotes a demodulated signal judgement section which determines whether the code converted to the binary number system is a start bit or is the channel number, etc. Reference numeral 41 denotes a speech synthesis control section which controls output of specific speech synthesis in response to the output from the demodulated signal judgement section 40.

Operation of this invention will be described as follows. In the receiving section which is constituted as above, when the receiving section receives a signal from a remote calling party, the calling signal is detected by the closing control section 30, and the load relay Y-1 is set to ON. As a result, the telephone line is set to the closed condition through the point of contact y1-1 of the relay Y-1, the calling signal stops, and the telephone set is set to a "talking condition" over the telephone. Plural pulses are output from the outgoing message control section, and the outgoing message, "I am not in, please call back later", for example, is selected in the speech synthesis section and is output. This outgoing message is sent to the calling party through the amplifier 33 and the line transformer LT.

When the calling party sends the bar code from the transmitting section 1 for reserving a TV program read from the TV program table etc., after the calling party listens to the outgoing message, the bar code shown in FIG. 5(c) is demodulated to the same waveform shown in FIG. 5(d) as the waveform shown in FIG. 5(b) through the line transformer LT, the amplifier 34 and the demodulating section 36. The waveform is sent to the VCR 6 as infrared rays, as shown in FIG. 1 through the output section 37 and the light emitting diode 38, and is stored in the memory (not shown in the drawings) of the VCR 6.

The content of the bar code starts with a start bit and ends with a stop bit, for example as shown in FIG. 4. The demodulated signal memory section 39 memorizes the channel, the month, the date, the start time, and the end time by the input thereof, when the start bit is detected, and stops inputting the data when the stop bit is detected. The data of the channel is sent to the demodulated signal judgement section, and the channel number is determined and sent as data to the speech synthesis control section 41. After the corresponding address in the speech synthesis section 32 is designated, the start pulse is output and synthesized speech, "Channel 4" for example, is sent to the calling party.

When the end of the synthesized speech is detected, a shift signal is output to the demodulated signal memory section 39 and the demodulated signal judgement section 40. The data relating to "month", which means the next code, is judged, and the synthesized speech, "November" for example, is sent.

When the owner sets the telephone set to on-hook after the owner listens to all the data by the synthesized speech and confirms that there is no mistake in the data, the on-hook is detected by the closing control section 30. As a result, the relay Y-1 is set to OFF, and the receiving section 5 is restored to the waiting condition.

Accordingly, the data can be confirmed by the synthesized speech after the stop bit of the bar code is detected (it is possible to use a delay circuit of 2-3 seconds) so that it can be prevented that the bar code is masked by the output of the synthesized speech. The codes which form "channel" to "end time" shown in FIG. 3 are the numbers 0-9. When any other code is input, this input means an error, and "error" by the synthesized speech is sent.

This invention is explained relating to the remote control of a VCR, for example as above. However, it is available to all kinds of devices that send the read signal by using the bar code through the telephone line; accordingly, this invention can apply to devices in a wide scope.

As in the above explanation, this invention can send acoustically a signal to the receiving device of the other party through the mouthpiece of the telephone set from the telephone line by means which can not be anticipated by the conventional device that sends the bar code signal through the telephone line, namely, by modulating the signal and outputting the signal through the speaker by using a bar code reader, etc., which is carried in the pocket of each person. The invention decodes the signal, demodulates the signal to a bar code signal, and converts the bar code signal to an infrared signal. As a result, it is possible to use the invention for controlling intended machines and tools, for example. Accordingly the practical effect of the present forwarding device is increased.

The foregoing description of the preferred embodiment of the invention has been presented for purposes of illustration and description and is not intended to be exhaustive or to limit the invention to the precise forms disclosed, since many modifications and variations are possible in light of the above teaching. The embodiment was chosen and described in order best to explain the principles of the invention and its practical application, thereby to enable others skilled in the art best to utilize the invention in various embodiments and with various modifications as are suited to the particular use contemplated therefor. It is intended that the scope of the invention be defined by the claims appended hereto, when interpreted in accordance with full breadth to which they are legally and equitably entitled.

I claim:

1. A bar code transmission and reception system, comprising;
    means for storing an output signal of a bar code reader which is generated by scanning a series of bar codes;
    means for modulating the stored signal into an audible signal within a transmission characteristic of telephone lines and for sending out the audible signal from a loudspeaker;
    means for transmitting the loudspeaker signal to a remote location through a mouthpiece of a telephone set;
    means for demodulating said audible signal received through the telephone lines to generate a reproduced bar code signal;
    means for decoding said reproduced bar code signal to generate alphanumeric data contained therein;
    means for detecting a stop bit in said reproduced bar code signal; and
    voice synthesizer means for informing a calling party of contents of the bar code after said stop bit of said bar code signal is detected.

2. The system of claim 1, including means responsive to said demodulating means for controlling an external apparatus.

3. A method of transmitting a bar code, comprising the steps of:
scanning a bar code to produce a bar code signal;
modulating the bar code signal into an audible signal within a frequency band suitable for audio transmission over telephone lines;
acoustically coupling said audible signal onto a telephone line;
receiving and demodulating said audible signal coupled on the telephone line to develop a reproduced bar code signal;
decoding said reproduced bar code signal to generate alphanumeric data contents thereof;
detecting an end of said reproduced bar code, and, in response, audibly informing a calling party of said alphanumeric data contents of said reproduced bar code.

4. The method of claim 3, including the step of using said audible signal, demodulated in said receiving and demodulating step, to control an external apparatus.

5. A bar code transmission and reception system, comprising:
memory means for storing an output signal from a bar code reader, said output signal generated by scanning a series of bar codes;
modem means for modulating the stored output signal onto an audio signal and for supplying the modulated audio signal to a telephone line;
receiving means for receiving said modulated audio signal from said telephone line and, in response, supplying a reproduced bar code signal; and
decoding means for generating alphanumeric data contained in said reproduced bar code signal.

6. The system of claim 5, further comprising means for detecting a stop bit from said reproduced bar code signal and, in response to detecting said stop bit, providing a voice message over said telephone line indicating detection of said stop bit.

7. The system of claim 5 wherein said receiving means includes a light emitting diode for generating a light signal in response to said reproduced bar code signal.

8. The system of claim 5 further comprising detector means for detecting a ring signal on said telephone line and, in response, providing an off-hook condition on said telephone line and means responsive to the detected ring signal for supplying a voice message signal onto said telephone line.

9. The system of claim 5 further comprising means for decoding said reproduced bar code signal and voice synthesizer means responsive to a resulting decoded reproduced bar code signal for supplying a voice message signal onto said telephone line.

10. A method of transmitting a bar code, comprising the steps of:
scanning a bar code to produce a bar code signal;
modulating said bar code signal with an audio signal to produce a modulated audio signal;
supplying said modulated audio signal to a telephone line;
receiving said modulated audio signal from said telephone line at a remote site;
demodulating said modulated audio signal to recapture said bar code signal;
converting said recaptured bar code signal to binary data;
supplying a light signal in response to the recaptured bar code signal;
detecting an end of the recaptured bar code signal; and
supplying, in response to said detecting step, a voice message signal onto said telephone line.

11. The method of claim 10, further including the steps of detecting a ring signal on said telephone line and, in response, providing an off-hook condition on said telephone line and, responsive to the detected ring signal, supplying a voice message signal onto said telephone line.

12. The method of claim 10, further comprising the steps of decoding the recaptured bar code signal and, in response, synthesizing a voice message signal for transmission over said telephone line.

13. The method of claim 10, further comprising the step of modulating the light signal with said bar code signal.

14. A method of using bar code data to control an apparatus, comprising:
(a) irradiating a bar code to derive a first pulse train;
(b) modulating said first pulse train to an audio frequency signal;
(c) transmitting said audio frequency signal from an originating station over a telephone line;
(d) receiving said audio frequency signal from the telephone line at a remote station;
(e) demodulating said audio frequency signal to derive a second pulse train identical to said first pulse train;
(f) converting said second pulse train directly to infrared radiation; and
(g) applying said infrared radiation to an apparatus to be controlled.

15. The method of claim 14, wherein step (e) further comprises the steps of
storing a portion of said second pulse train;
converting said stored portion of said pulse train to alphanumeric data; and
outputting audio data from said remote station to said originating station in response to content of said alphanumeric data.

16. The method of claim 15, wherein said audio data is transmitted as synthesized speech.

17. The method of claim 14, wherein said first and second pulse trains have a frequency of 28 KHz.

18. The method of claim 14, wherein said audio frequency signal has a frequency of 2.1 KHz.

19. A system of using bar code data to control a remote apparatus comprising:
bar code reader means for deriving a first pulse train from light reflected from a printed bar code representing bar code data;
modem means for modulating said first pulse train onto an audio signal and for supplying the modulated audio signal to a telephone line;
receiving means for receiving said modulated audio signal from said telephone line;
demodulating means for converting said modulated audio signal to a second pulse train identical to said first pulse train; and
output means for converting said second pulse train directly to infrared radiation, whereby said bar code data is not converted to alphanumeric data.

20. The system of claim 19 wherein said first and second pulse trains have a frequency of 28 KHz.

21. A system for transmitting bar code data to control a remote apparatus comprising:
- bar code reader means for deriving a first data sequence from light reflected from a printed bar code, said first data sequence comprising a start field, a stop field and a plurality of information fields;
- modem means for modulating said first data sequence onto an audio signal and for supplying the modulated audio signal to a telephone line;
- receiving means for receiving said modulated audio signal from said telephone line;
- demodulating means for converting said modulated audio signal to a second data sequence identical to said first data sequence, said second data sequence comprising a start field, a stop field and a plurality of information fields;
- means for storing said plurality of information fields;
- detecting means coupled to said storing means for initiating input of said plurality of information fields to said storing means when said start field is detected and for terminating input of said plurality of information fields to said storing means when said stop field is detected;
- voice synthesizer means coupled to said storing means and responsive to each information field outputted from said storing means for generating a voice signal;
- shifting means responsive to said voice signal for shifting said plurality of information fields stored in said storing means to output an information field from said storing means;
- output optical means for converting said plurality of information fields outputted from said storing means to optical signal for controlling the remote apparatus.

* * * * *